United States Patent
Mulder et al.

(10) Patent No.: US 12,166,443 B2
(45) Date of Patent: Dec. 10, 2024

(54) SWITCHING DEVICE, ELECTRICAL DRIVE AND METHOD FOR SETTING UP A SWITCHING DEVICE

(71) Applicant: RIDDER DRIVE SYSTEMS B.V., Harderwijk (NL)

(72) Inventors: Steven Mulder, Harderwijk (NL); Vincentius Adrianus Franciscus Hoveling, Harderwijk (NL)

(73) Assignee: RIDDER DRIVE SYSTEMS B.V., Harderwijk (NL)

( * ) Notice: Subject to any disclaimer, the term of this patent is extended or adjusted under 35 U.S.C. 154(b) by 0 days.

(21) Appl. No.: 17/792,094

(22) PCT Filed: Jan. 19, 2021

(86) PCT No.: PCT/NL2021/050033
§ 371 (c)(1),
(2) Date: Jul. 11, 2022

(87) PCT Pub. No.: WO2021/150107
PCT Pub. Date: Jul. 29, 2021

(65) Prior Publication Data
US 2023/0051606 A1    Feb. 16, 2023

(30) Foreign Application Priority Data

Jan. 20, 2020   (NL) ..................................... 2024705

(51) Int. Cl.
*E06B 9/32*   (2006.01)
*E05F 15/40*   (2015.01)
(Continued)

(52) U.S. Cl.
CPC .............. *H02P 27/06* (2013.01); *E05F 15/40* (2015.01); *E05F 15/619* (2015.01);
(Continued)

(58) Field of Classification Search
CPC ... H02P 27/06; H02P 6/16; E06B 9/32; G05D 3/10; E05F 15/619; G05B 19/409
See application file for complete search history.

(56) References Cited

U.S. PATENT DOCUMENTS

| | | | | |
|---|---|---|---|---|
| 5,760,558 | A | * | 6/1998 | Popat ........................ E06B 9/32 160/188 |
| 2012/0173024 | A1 | * | 7/2012 | Feldstein ............. A47H 5/0325 160/331 |
| 2015/0376943 | A1 | * | 12/2015 | Slupik ..................... G05D 3/10 318/626 |

FOREIGN PATENT DOCUMENTS

| | | |
|---|---|---|
| DE | 19522622 A1 | 1/1997 |
| EP | 1710640 A1 | 10/2006 |
| WO | 03081358 A1 | 10/2003 |

OTHER PUBLICATIONS

International Search Report and Written Opinion for PCT/NL2021/050033, dated Mar. 12, 2021 (16 pages).

(Continued)

*Primary Examiner* — Cortez M Cook
(74) *Attorney, Agent, or Firm* — KDW Firm PLLC (57) ABSTRACT

A switching device for switching an electric motor includes a control unit configured to provide a first switching signal for the electric motor, a memory configured to store at least one end position, and a position sensor configured to provide the control unit with an electrical position signal which indicates a measured position. The control unit is connected communicatively to wireless communication means and is configured to store the measured position in the memory as said at least one end position on the basis of the position signal in response to a received first instruction. The control unit is configured to provide the first switching signal by comparing the stored end position and a position signal measured by the position sensor. A drive with such a (Continued)

switching device and a method for setting up such a switching device.

20 Claims, 4 Drawing Sheets

(51) Int. Cl.
  *E05F 15/619*     (2015.01)
  *G05B 19/409*     (2006.01)
  *G05B 19/425*     (2006.01)
  *H02K 11/21*      (2016.01)
  *H02P 6/16*       (2016.01)
  *H02P 27/06*      (2006.01)

(52) U.S. Cl.
  CPC ......... *G05B 19/409* (2013.01); *G05B 19/425* (2013.01); *H02K 11/21* (2016.01); *H02P 6/16* (2013.01); *E05Y 2201/722* (2013.01); *E05Y 2400/32* (2013.01); *E05Y 2900/152* (2013.01); *G05B 2219/33192* (2013.01); *G05B 2219/36463* (2013.01); *G05B 2219/36464* (2013.01); *G05B 2219/36465* (2013.01); *G05B 2219/45242* (2013.01)

(56) References Cited

OTHER PUBLICATIONS

NN., "Funkantrieb Oximo RTS Gebrauchsanleitung", Aug. 2, 2007, pp. 1-20. https://www.somfy.de.downloads/de/ga_oximo_rts_rev02_07_2007.pdf.

* cited by examiner

SWITCHING DEVICE, ELECTRICAL DRIVE AND METHOD FOR SETTING UP A SWITCHING DEVICE

This application is a national stage filing under 35 U.S.C. 371 of pending International Application No. PCT/NL2021/050033, filed Jan. 19, 2021, which claims priority to Netherlands Patent Application No. 2024705, filed Jan. 20, 2020, the entirety of which applications are incorporated by reference herein.

The invention relates to a switching device for switching an electric motor, comprising a control unit which is configured to provide a first switching signal for the electric motor, a memory which is connected communicatively to the control unit and is configured to store at least one end position, and a position sensor which can be connected to an element driven by the electric motor and is connected communicatively to the control unit and is configured to provide the control unit with an electrical position signal which indicates a measured position, wherein the control unit is configured to provide the first switching signal on the basis of a comparison between the at least one end position stored in the memory and a position signal measured by the position sensor.

Such a switching device is known from EP 3 249 767 A2. The known switching device is generally set up as follows. The switching device is connected to the electric motor in order to switch the motor with the first switching signal. The position sensor is further connected to an element driven by the motor. The position sensor thereby measures the position of the driven element. The driven element is then moved to an end point. For this purpose the motor is switched on and off by a manually switched signal. When the driven element has reached the end point, the end position is recorded by means of a button on the switching device. The recorded end position is then used in order to prevent the motor from displacing the driven element beyond this end position.

When the switching device is used in for instance a greenhouse, the electric motor and the switching device are generally installed in a hard-to-reach place, such as at the top of the greenhouse, in which case the motor and switching device can only be reached from a ladder. The motor is provided with a wired connection to a central control panel, whereby manual operation of the electric motor is possible. The control panel is generally situated at a distance from the motor and the switching device because it needs to be easier to reach. Two technicians work together to set up the switching device. The first technician moves the motor to the correct position using the control panel and the second technician, who is for instance on a ladder, has access to the switching device in order to program the end position.

There is a need to reduce the number of man hours required for the setup process.

The invention therefore has for its object to provide a switching device whereby the setup process can be performed more efficiently.

This object is achieved with a switching device of the type stated in the preamble, wherein the control unit is connected communicatively to wireless communication means and is configured to store the measured position in the memory as said at least one end position on the basis of the position signal in response to a first instruction received by the wireless communication means.

By configuring the control unit such that it stores the measured position as end position on the basis of a wirelessly received signal it is no longer necessary to have access to the switching device during the setup process. Instead, the switching device can for instance be operated from the control panel by the first technician. The second technician is thereby not needed during the setup process and can occupy him/herself with for instance installation of other components of the greenhouse.

The switching device according to the invention can be used to provide a first switching signal for an electric motor. The first switching signal can for instance be the motor current, or an optionally digital signal whereby the motor current is switched directly or indirectly, such as via a relay. The first switching signal can also be provided wirelessly, for instance via the wireless communication means.

By means of the first switching signal the motor can for instance be switched off when the driven element approaches the end position and/or approaches the end position from a determined direction and/or has passed the end position in a determined direction. The switching device can hereby thus provide for shutting off of the motor at or close to or beyond the set end position.

The first switching signal can be provided as electric voltage on a first contact of the switching device. A separate first contact can be provided for each end position. The switching device particularly has two first contacts, these corresponding with two stored end positions.

As an alternative to the wireless communication means, and the storing of the end position in response to an instruction received thereby, or as an additional measure, the switching device can be provided with a user interface for providing a second instruction in response to user input at the control unit, wherein the control unit is configured to store the measured position in the memory as said at least one end position on the basis of the position signal in response to receiving the second instruction, and wherein the user interface is further configured to provide in response to user input a control signal whereby an electric motor connected to the switching device can be controlled to a desired position.

Using the user interface it is possible to both store the end position and generate a control signal for the electric motor. A single user, who is located at the switching device, can thereby both control the motor and set the end position.

This is another reason it is no longer necessary for the end positions to be recorded by two technicians, since one single technician is able to perform the necessary actions at the switching device.

The alternatives of the wireless communication means and the user interface, which can also be used as additional measures, thus both ensure that a switching device can be set up by only one technician. They both contribute here to a reduction in the number of man hours required for setting up a switching device.

The user interface can comprise one or more buttons. The control signal can for instance distinguish between a command to rotate in one direction and a command for standstill. The control signal can further optionally also distinguish between a command to rotate in a different direction, and the above stated commands. The control signal may consist of one voltage level, for instance on a contact provided for this purpose. The control signal can however also consist of a plurality of electrical signals at a plurality of contacts, or can be a digital signal.

The switching device with the user interface can of course also be provided in the embodiments described below.

In a first embodiment of the switching device according to the invention the control unit is further configured to receive a third instruction via the wireless communication means and, in response to receiving the third instruction, to transmit a message comprising information about at least the at least one stored end position. The message can be transmitted via the wireless communication means.

In a second embodiment of the switching device according to the invention the control unit is further configured to receive a setup message via the wireless communication means, wherein the setup message comprises information about at least one desired end position, and to store the desired end position in the memory as said at least one end position in response to receiving the setup message.

Such switching devices make it possible to accelerate the setup process of a plurality of switching devices. It is thus possible to set up a first switching device, according to the first embodiment, in the above-described manner by means of the wireless communication means. The stored end position can then be retrieved from the first switching device by transmitting the third instruction.

The end position of the first switching device can then be used as end position of a second switching device according to the second embodiment by sending it a setup message with information about the end position of the first switching device. The motor connected to the second switching device need hereby not be displaced to the position corresponding to the end position. This can be particularly advantageous because displacing of the motor to the end position takes up a relatively large amount of time.

The message which comprises the information about the stored end positions and is transmitted by one switching device can thus form the setup message for another switching device. When use is also made of an intermediate position and/or emergency position, these can be transmitted by one switching device in the message with the information in the same way and be adopted by another switching device from this message received as setup message. End positions and/or intermediate positions and/or emergency positions can be represented in a message as a series of numeric values.

It is otherwise also possible to use the switching device with two end positions. In that case the memory is configured to store two end positions. When such a switching device is used in a greenhouse, the end positions can for instance correspond with closed or opened windows or screens.

In the case of the two end positions it is particularly advantageous if the motor of the second switching device need not be displaced to the end positions, since this would in this case take up even more time.

In another embodiment of the switching device according to the invention the control unit is further configured to provide a position signal which indicates the position measured by the sensor. The control unit can for instance be configured to transmit the position signal via the wireless communication means.

By providing the position signal the measured position can also be externally accessible. It can thereby be used outside the switching device, for instance as feedback in a control system or in a climate control system. The position signal can further be used to synchronize a plurality of motors with a plurality of switching devices by transmitting the position signal of one switching device to another switching device in a reference position message.

For this purpose the control unit can further be configured to receive a reference position message via the wireless communication means, wherein the reference position message comprises information about at least a reference position, and to provide the first switching signal on the basis of a comparison between the reference position and the measured position.

In this way the electric motor can be switched off when the measured position differs or differs too much from the reference position message. The synchronization of a plurality of motors can be achieved in this way.

In yet another embodiment of the switching device according to the invention the position sensor is configured to detect the position of the element driven by the electric motor in absolute sense. In this embodiment end positions can be stored in the memory in absolute sense.

In absolute sense is understood to mean here that it is possible to distinguish between a first position, i.e. angular position, of the driven element and a second position of the driven element which differs from the first position, even when the second position differs from the first by for instance an integer number of rotations of the driven element. An absolute position detection can for instance be achieved by also recording a number of rotations of the driven element, in addition to a position of the driven element. The sensor can further be configured also to record the number of rotations and/or a position of the driven element without external energy source. This can for instance be achieved using a Wiegand wire.

The position sensor can alternatively or additionally comprise an angular displacement sensor and a battery which can feed the sensor, at least when an external power supply fails. The angular displacement sensor can be configured to detect a rotation, i.e. a change in angular position. With such a sensor the angular position of the driven element can be tracked by adding in each case the detected rotation to the last calculated angular position. Using the battery, rotation can be recorded even if the power supply fails. The rotation can then be used, for instance once the power supply has been restored, to calculate the angular position of the element driven by the electric motor. The angular displacement sensor can also be configured to detect an angular position of the driven element, instead of or in addition to a rotation thereof. Using the battery, the angular position can also be detected if the external power supply fails. This prevents the position sensor from giving an incorrect value after the external power supply has been restored in the event that the driven element has rotated during the external power supply failure. Such an incorrect value can occur because a sensor which records the angular position is unable on its own to distinguish between positions of the driven element which differ from each other by an integer number of rotations.

The battery can alternatively or additionally make it possible to record rotation and/or angular position during power failure.

Alternatively or additionally, the position sensor can comprise two angular displacement sensors which can be connected with respectively a first and a second mechanical transmission to the element driven by the electric motor. The first and the second mechanical transmission have a different transmission ratio. By comparing the measured values of the two angular displacement sensors to each other a relatively large number of rotary displacements of the driven element can be distinguished owing to their mutually differing transmission ratios. The use of the two angular displacement sensors is particularly advantageous in detection of an angular position by the angular displacement sensors, but can also be used when the angular displacement sensors detect rotation.

Use can of course also be made of a battery when two angular displacement sensors are used, in order to thus enable recording of rotation and/or angular position during failure of the external power supply.

It is possible in all cases to use more than two angular displacement sensors, each with a different transmission.

In yet another embodiment of the switching device according to the invention the memory is configured to store at least one intermediate position, and the control unit is further configured to provide a second switching signal on the basis of a comparison between the at least one intermediate position and the position signal provided by the position sensor.

The second switching signal can be used also to control other actuators, in addition to the electric motor. The second switching signal can for instance be used to switch a fan on and off. It is advantageous here for the switching device to have a second contact on which the second switching signal is provided. The second switching signal can for instance provide a relatively high voltage if the measured position is higher than the intermediate position and a relatively low voltage if this is not the case, or vice versa.

The switching device can have a separate second contact for each intermediate position.

By way of example, each intermediate position can be programmed by storing the measured position in the memory as the intermediate position on the basis of the position signal in response to an instruction received by the wireless communication means. Prior to this, the motor can be moved to the desired intermediate position by means of the above described manual operation.

In yet another embodiment of the switching device according to the invention the memory is configured to store at least one emergency stop position, and the control unit is further configured to provide a third switching signal on the basis of a comparison between the at least one emergency stop position and the position signal provided by the position sensor.

By using a third switching signal, which is provided on the basis of a comparison to an emergency stop position, it is possible to prevent an electric motor connected to the switching device from being activated in or beyond a determined position. In practice the third switching signal is for this purpose used to completely shut off the power supply to the electric motor. The first switching signal may conversely be used to prevent the motor from running in a determined direction. The first and third switching signal can thus be used for different applications. Depending on the configuration of the power supply of the electric motor, it is necessary to restart it manually after being shut off in reaction to the third switching signal.

The third switching signal can be provided on a third contact of the switching device. It is advantageous to provide the third switching signal for a plurality of emergency stop positions on the same third contact. In this way fewer separate third contacts are necessary.

The invention also relates to an electrical drive for driving an element, comprising an electric motor which can be connected to the element for driving, and a switching device as described above, wherein the electric motor is connected to the control unit of the switching device and is configured to be switched on and/or off by the first switching signal of the switching device.

The switching device of the electrical drive can have the above stated features relating to the switching device in any suitable combination, and therefore provide the advantages stated therewith.

The invention also relates to a method for setting up at least one switching device as described above, preferably for an electrical drive as described above, comprising the following steps, to be performed in any suitable sequence, of:
a) moving the driven element to a position, for instance using the user interface, which position corresponds with an end position which must be stored; and
b) transmitting the first instruction via the wireless communication means or providing the second instruction via the user interface.

The method according to the invention provides the advantage that access to the motor or switching device is not necessary for the purpose of recording the end position, or that the motor can be controlled from the switching device by means of the user interface. The presence of a second technician is thereby no longer required.

In an embodiment of the method according to the invention, wherein at least two switching devices are set up, the method comprises of:
providing a first switching device, in the above stated first embodiment, and a first electric motor connected thereto; and
providing a second switching device, in the above stated second embodiment, and a second electric motor connected thereto; wherein
the first and the second electric motor are in the same position, and wherein the method further comprises of:
setting up the first switching device according to the method according to the invention; and
retrieving the at least one stored end position of the first switching device by transmitting the third instruction via the wireless communication means of the first switching device; and
setting up the second switching device by transmitting via the wireless communication means thereof a setup message comprising information about the at least one requested end position of the first switching device.

According to this method, the end position of the first switching device is copied to the second switching device. For the purpose of storing an end position the motor connected to the second switching device, and the element driven thereby, need not be displaced. This can save a lot of time, particularly when a plurality of end positions, for instance two end positions, must be stored.

The invention will be further elucidated with reference to the accompanying figures, wherein.

The same elements are designated in the figures with the same reference numerals. The same elements of different embodiments are in each case designated with reference numerals increased by 100 (one hundred) for the different embodiments.

Figure 1A:
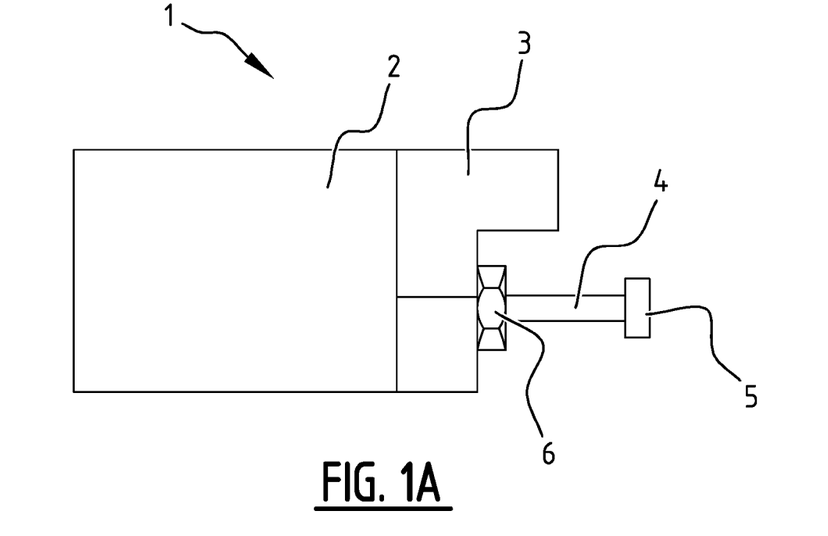
FIG. 1A shows schematically a drive with an electric motor and a switching device according to the invention.
Figure 1B:
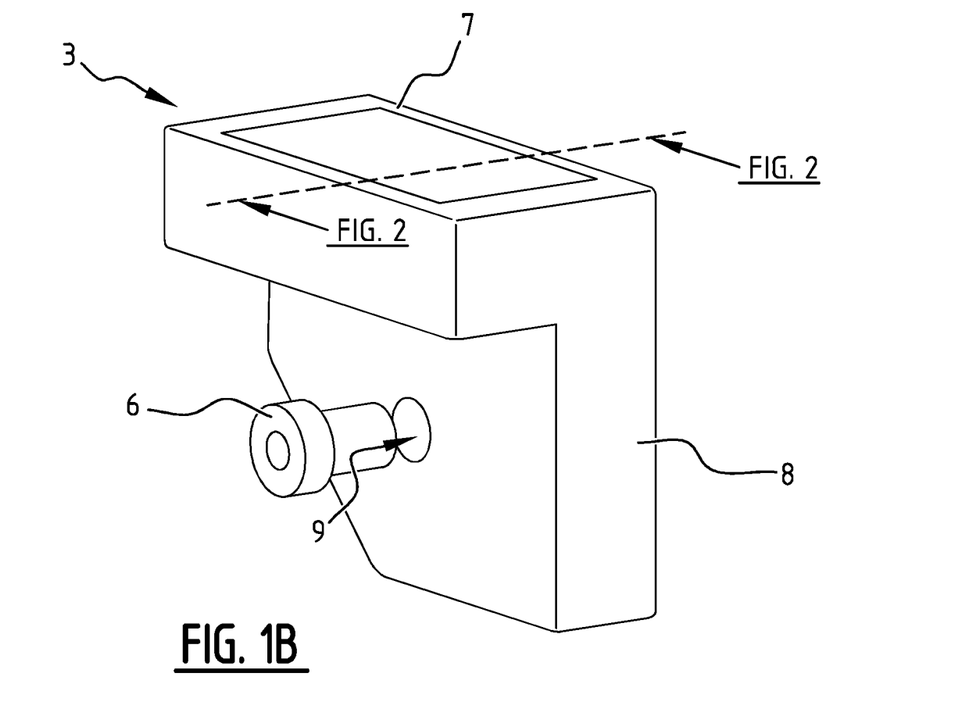
FIG. 1B shows schematically a perspective view of the switching device of FIG. 1A.

FIG. 1A shows a drive 1 comprising an electric motor 2 and a switching device 3. Motor 2 is connected to a shaft 4, and drives this shaft. Arranged on the end of the shaft 4 furthest removed from motor 2 is a toothed wheel 5. Things other than toothed wheels can of course also be driven by motor 2 via shaft 4, optionally using a toothed wheel 5. The drive of FIG. 1A can particularly be used to open or close windows in a greenhouse and/or to unfold or fold up or unroll or roll up screens in a greenhouse. Switching device 3 is connected via a coupling element 6 to shaft 4. FIG. 1B shows a possible design of switching device 3. In this embodiment the switching device has a first housing part 7 and a second housing part 8 connected thereto, which are mutually connected and define a substantially closed space. Arranged in second housing part 8 is a continuous opening 9 through which a shaft 4 can be placed. Opening 9 corresponds with coupling element 6 in respect of dimensions, so that this element can be received at least partially in opening 9.

Figure 2:
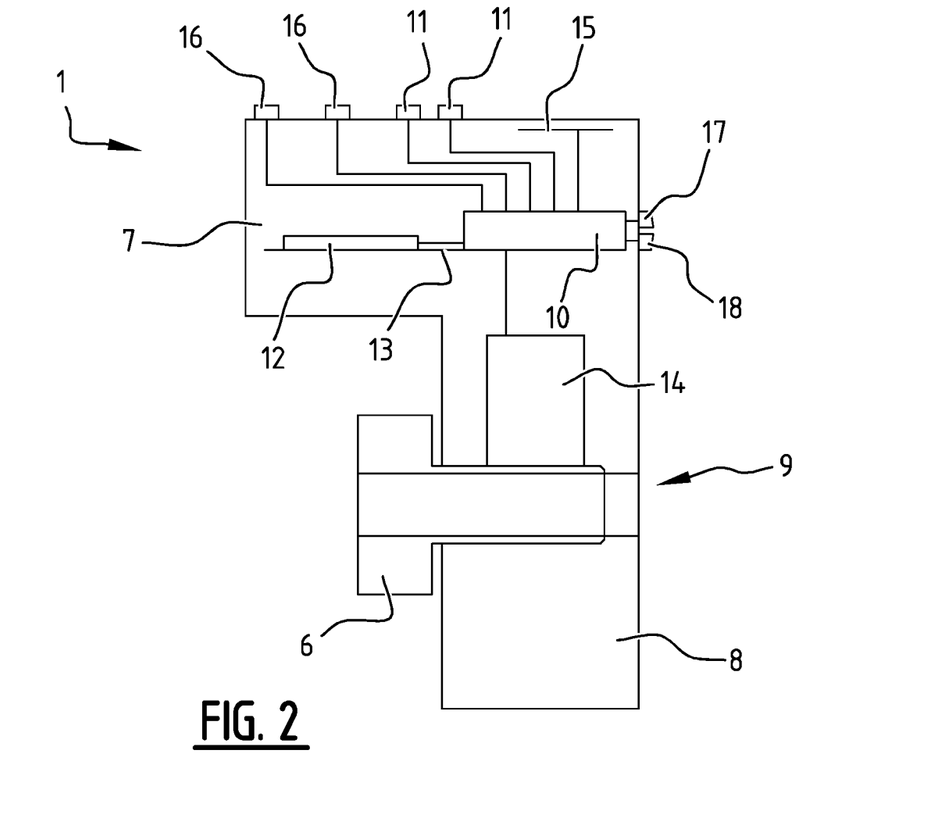
FIG. 2 shows schematically a cross-section of the switching device of FIGS. 1A and 1B.

FIG. 2, in which the switching device 3 of FIGS. 1A and 1B is shown schematically in cross-section, shows more details of switching device 3. It can thus be seen that switching device 3 has a control unit 10. In this case control unit 10 is connected to two first contacts 11. By applying a voltage to the first contacts 11 the control unit can provide a first switching signal for motor 2. The switching device further has a memory 12 which is connected to control unit 10. Memory 12 can be used to store end positions, in this case two end positions, which correspond with the two first contacts 11. Both control unit 10 and memory 12 are arranged on a printed circuit board 13 which is arranged in first housing part 7. Arranged in second housing part 8, close to opening 9, is a position sensor 14 which is connected to control unit 10. Position sensor 14 measures the position of coupling element 6. Because coupling element 6 is connected to shaft 4, sensor 14 measures the position of shaft 4 indirectly. When no coupling element 6 is used, it is of course also possible to measure the position of shaft 4 directly using position sensor 14. Position sensor 14 provides an electrical signal which indicates the measured position to control unit 10. Position sensor 14 is configured to detect the position of shaft 4 in absolute sense. Control unit 10 is further also connected to wireless communication means 15, which are shown schematically as antenna 15 in FIG. 2. Different types of wireless communication means can be used, the wireless communication means therefore must not be deemed to be limited to antenna 15.

When the end positions are stored in the memory 12, control unit 10 can compare the position measured by position sensor 14 to the end positions stored in memory 12 using the signal of position sensor 14. The first switching signal can then be given on the basis of this comparison. The first switching signal can be a digital voltage, for instance on each of the first contacts 11, wherein a high signal is for instance used as 'on' and a low signal as 'off'. When motor 2 has reached and/or has passed an end position, the first switching signal 'on' can on the basis of the above stated comparison be given on the first contact 11 associated with that end position in order to indicate that this end position has been reached. The 'off' signal can be given if this is not the case. In this way a first switching signal can be given at each first contact 11 on the basis of a comparison between a respective end position and the measured position. Switching device 3 can be connected to motor 2 by means of the first contacts 11. It is thus possible to provide a motor control which provides motor 2 with motor current on the basis of, among other things, the voltage received via first contacts 11, for instance via one or more relays. Such a motor control can for instance additionally be activated on the basis of a different signal. Instead of a binary voltage, it is also possible to provide first contacts 11 with motor current and thereby drive motor 2 directly. The motor current can in this case also still be referred to as switching signal.

Figure 3:
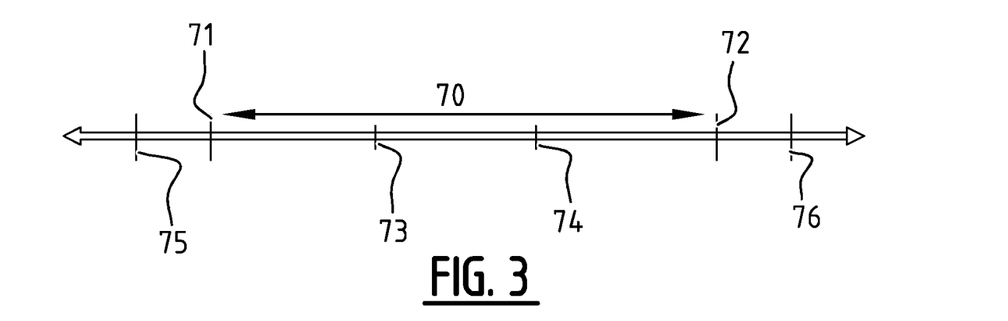
FIG. 3 shows schematically the operating range of an electric motor.

The switching device 3 as described above can be used in for instance a greenhouse to open and close windows and/or to unfold and fold up or unroll and roll up screens. The driving of windows is used below by way of example. It is usual to provide an electric motor 2 to open or close one or more windows. It is important here that motor 2 does not attempt to drive the windows beyond a fully open or fully closed position, since this could cause damage to the motor and/or the windows and/or a possible drive line therebetween. FIG. 3 shows schematically an operating range 70 between a first end point 71 and a second end point 72. In the example above the first end point 71 can correspond with a fully closed position of the windows and the second end point 72 with a fully open position of the windows. The switching device is set up such that the stored end positions correspond with the respective first end point 71 and second end point 72. When motor 2 is activated, for instance on the basis of the other signal, to move such that the windows move from first end point 71 to second end point 72, the first switching signal at first contact 11 which corresponds with the end position at end point 72 is first for instance low, i.e. 'off'. When the motor has driven the windows to such an extent that end point 72 has been reached, the switching device gives a high signal, i.e. 'on', at said first contact 11. This indicates that end point 72 has been reached, and the motor can be stopped. The same can be done mutatis mutandis for end point 71. Using the first switching signal for each of the end points 71, 72 on a separate first contact 11 enables setup of a motor control which can only be moved toward the one end point 71 once the other end point 72 has been reached, and vice versa.

Figure 4:
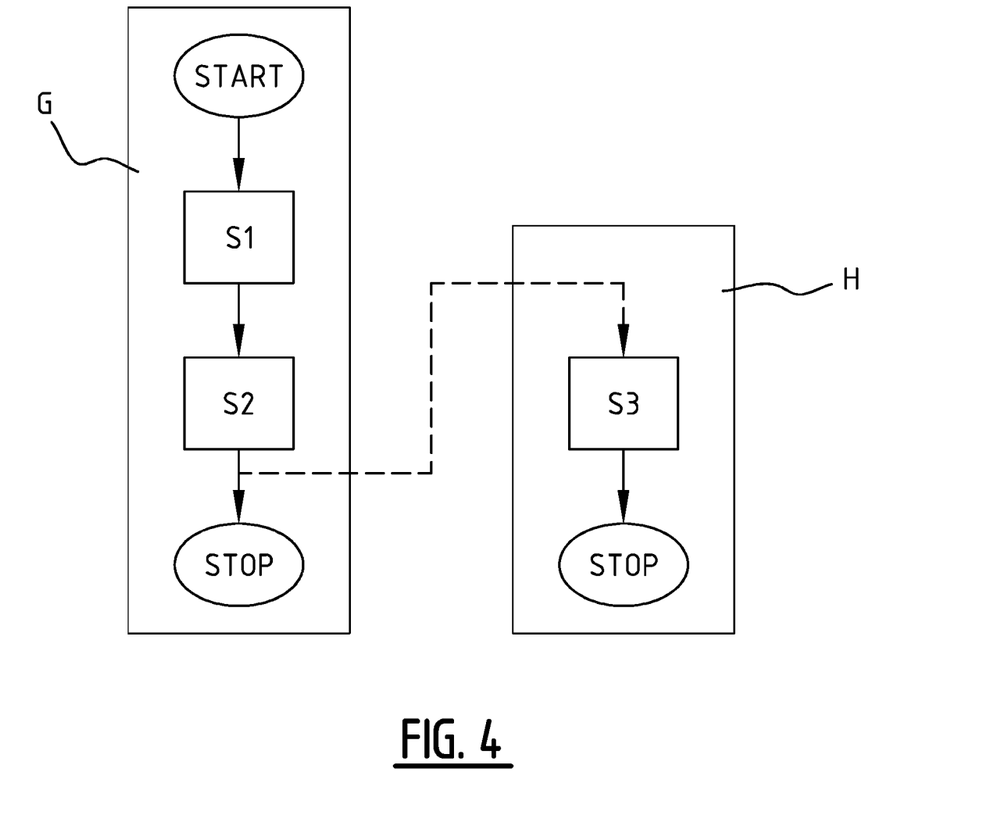
FIG. 4 shows a flow diagram for setting up a switching device.

FIG. 4 shows how the end positions can be set in switching device 3. Firstly, in a first step S1 the motor 2 is controlled, for instance via the other signal, to reach an end point, for instance first end point 71. In a second step S2 a first instruction is then sent to switching device 3 via the wireless communication means 15 thereof. In response, designated in FIG. 4 with the broken line, control unit 3 stores the position measured by position sensor 14 as first end position in a step S3 which is performed by the motor. Steps S1 and S2 are performed by a user, which is designated with G, and step S3 by the switching device 3, which is designated with H, more particularly by the control unit 10 thereof. The steps can then be repeated for the second end point 72 and the second end position.

Switching device 3 is further configured to send in response to a third instruction a message comprising information about the stored end positions, and to receive a setup message via the wireless communication means 15. The setup message comprises information about at least one desired end position. In response to receiving the setup message, control unit 10 stores the desired end position in the memory as said at least one end position. Two of such switching devices can then be set up as described in FIG. 5.

Figure 5:
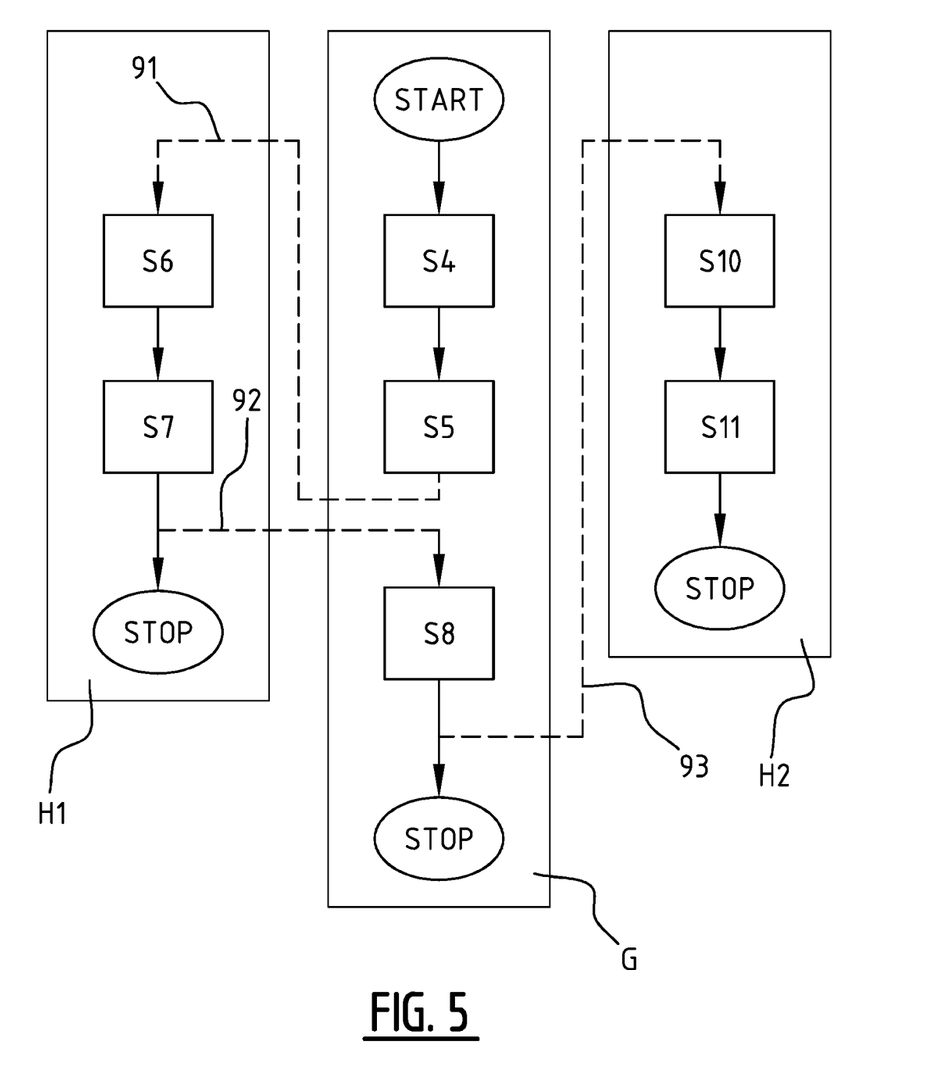
FIG. 5 shows a flow diagram for setting up two switching devices.

Firstly, two such switching devices 3 are provided and each connected to an electric motor 2. The two motors 2 are moved to the same position. In step S4 a user G starts setting the end positions of first switching device 3. This can for instance be done as described above, and is therefore condensed into one step S4 in FIG. 5. It goes without saying that the first switching device 3 then also runs through the step S3 of FIG. 4, although this is not shown in FIG. 5 for the sake of simplicity. The setting of the end positions of first switching device 3 is followed by a step S5 in which the user sends a third instruction to first switching device 3. This is shown in FIG. 5 with a broken line 91. It is indicated in H1 that first switching device 3 receives the third instruction in a step S6 and then sends a message comprising information about the stored end positions in a subsequent step S7. As designated with broken line 92, the message is in turn received by the user. The user G thus requests the set end positions of first switching device 3 in this way. In a subsequent step S9, see broken line 93, the user then sends a setup message with the information about the end positions of first switching device 3 to second switching device 3. H2 shows which steps are then carried out by second switching device 3. Firstly, the setup message is received in a step S10. In a subsequent step S11 the end positions, information about which is comprised in the received setup message, are then stored on the basis of this information. In this way second switching device 3 can be set up without having to be moved to the end positions, as was the case for first switching device 3. It is of course possible to set up a plurality of switching devices 3 in this way after at least one switching device 3 has been set up, for instance according to the method of FIG. 4.

Control unit 10 of the shown switching device 3 is configured to provide a position signal which indicates the position measured by position sensor 14. In the shown case said position signal is transmitted via the wireless communication means 15. The position signal can for instance be used as feedback in an air conditioning system. In addition, switching device 3 is configured to provide the switching signal on the basis of a reference position message which is received via the wireless communication means 15. By using the position signal of one switching device 3 as reference signal for another switching device 3 the switching devices 3 can be connected in a so-called synchronous mode, in which the relative position of motors 2 connected to the two switching devices 3 is the same or not much different.

FIG. 3 further also shows two intermediate points 73, 74. The intermediate points 73, 74 lie between the end points 71 and 72. Intermediate positions, in this case two, corresponding with intermediate points 73, 74 can be stored in the memory 12 of switching device 3. The intermediate positions can for instance be set in similar manner as the end points 71, 72 by moving the motor to the intermediate point 73, 74 and storing the position measured at that intermediate point 73, 74 as intermediate position by means of an instruction to the switching device 3. Control unit 10 is further configured to provide a second switching signal on the basis of a comparison to each of the stored intermediate positions and the signal provided by position sensor 14. The second switching signal is provided, separately for each of the intermediate positions, as voltage at a second contact 16. The second switching signal can be used to control peripheral equipment on the basis of the position of the element driven by motor 2. It is possible by way of example to opt to give a high signal when the measured position lies between first end point 71 and first intermediate point 73.

As described above, using the first switching signal a motor 2 can be switched off when it reaches the position of an end point 71, 72. It is however possible for the motor to have a limited amount of overshoot, to a position beyond end point 71, 72, after being switched off, for instance due to the mass inertia of an element driven by the motor. The memory 12 of switching device 3 is therefore configured to store two emergency stop positions. The emergency stop positions correspond with emergency points 75, 76, each lying beyond their respective end points 71, 72. The emergency stop positions can for instance be set automatically, depending on the end positions. Control unit 10 is configured to provide a third switching signal on the basis of a comparison between the emergency stop positions and the measured position. The third switching signal can for instance be given as voltage at a third contact 17 of the switching device. On the basis of the comparison the third switching signal can for instance be given as 'on' when at least one of the emergency stop points 75, 76 is gone beyond. In that case the third switching signal is 'off' when the measured position lies between the two emergency stop points 75, 76. The third switching signal can be given on one third contact for both emergency stop points 75, 76, so for both emergency stop positions. Using the third switching signal use of the motor can be prevented when it is situated at or beyond an emergency stop point, for instance until a user releases the motor again after inspection, for instance by moving it to a position inside emergency stop points 75, 76. The third switching signal can particularly be used to switch off power supply to an electric motor 2, for instance by means of a relay. The supply voltage for motor 2 can alternatively be applied to the third contact by way of third switching signal. The signals on contacts 11, 16, 17 can in all cases be measured relative to a zero signal or ground signal which is applied to a ground 18 by control unit 10. A separate ground 18 can of course also be used for each contact.

Although the invention is elucidated above on the basis of a number of specific examples and embodiments, the invention is not limited thereto. The invention instead also covers the subject matter defined by the following claims.

It is thus for instance possible to use the switching device in for instance an animal accommodation or in crop storage, such as to open and close windows or air vents, or in public utility construction, such as to open and close sunblinds.

The invention claimed is:

1. A switching device for switching an electric motor, comprising:
   a control unit which is configured to provide a first switching signal for the electric motor;
   a memory which is connected communicatively to the control unit and is configured to store at least one limit position; and
   a position sensor which can be connected to an element driven by the electric motor and is connected communicatively to the control unit and is configured to provide the control unit with an electrical position signal which indicates a measured position;
   wherein the control unit is connected communicatively to a wireless communicator and is configured to store the measured position in the memory as said at least one limit position based on the position signal in response to a first instruction received by the wireless communicator; and
   wherein the control unit is configured to:
      provide the first switching signal based on a comparison between the at least one limit position stored in the memory and a position signal measured by the position sensor;
      receive a third instruction via the wireless communicator; and
      transmit a message comprising at least a value of the at least one stored limit position in response to receiving the third instruction.

2. A switching device for switching an electric motor, the switching device comprising:
   a control unit which is configured to provide a first switching signal for the electric motor;

a memory which is connected communicatively to the control unit and is configured to store at least one limit position; and a position sensor which can be connected to an element driven by the electric motor and is connected communicatively to the control unit and is configured to provide the control unit with an electrical position signal which indicates a measured position;

wherein the control unit is connected communicatively to a wireless communicator and is configured to store the measured position in the memory as said at least one limit position based on the position signal in response to a first instruction received by the wireless communicator; and wherein the control unit is configured to:
provide the first switching signal based on a comparison between the at least one limit position stored in the memory and a position signal measured by the position sensor;
receive a setup message via the wireless communicator, wherein the setup message comprises a value of at least one desired limit position; and
store the value of the at least one desired limit position in the memory as said at least one limit position in response to receiving the setup message.

3. The switching device according to claim 1, wherein the control unit is further configured to provide a position signal which indicates the position measured by the sensor.

4. The switching device according to claim 1, wherein the control unit is further configured to transmit the position signal via the wireless communicator.

5. The switching device according to claim 1, wherein the control unit is further configured to:
receive a reference position message via the wireless communicator, wherein the reference position message comprises information about at least a reference position; and
provide the first switching signal based on a comparison between the reference position and the measured position.

6. The switching device according to claim 1, wherein the position sensor is configured to detect the position of the element driven by the electric motor in absolute sense.

7. The switching device according to claim 1, wherein the memory is configured to store two limit positions.

8. The switching device according to claim 1, wherein the memory is configured to store at least one intermediate position, and wherein the control unit is further configured to:
provide a second switching signal based on a comparison between the at least one intermediate position and the position signal provided by the position sensor.

9. The switching device according to claim 1, wherein:
the memory is configured to store at least one emergency stop position; and
the control unit is further configured to provide a third switching signal based on a comparison between the at least one emergency stop position and the position signal provided by the position sensor.

10. An electrical drive for driving an element, comprising an electric motor connectable to the element, and a switching device according to claim 1, wherein the electric motor is connected to the control unit of the switching device and is configured to be switched on and/or off by the first switching signal of the switching device.

11. A method for setting up at least one switching device according to claim 1, comprising steps, to be performed in any sequence, of:
a) moving the driven element to a position that corresponds with a limit position which must be stored; and
b) transmitting the first instruction via the wireless communicator or providing the second instruction via a user interface.

12. A method for setting up at least two switching devices, the method comprising:
providing a first electric motor connected to a first switching device of the at least two switching devices, the first switching device comprising:
a control unit which is configured to provide a first switching signal for the first electric motor;
a memory which is connected communicatively to the control unit and is configured to store at least one limit position; and
a position sensor which can be connected to an element driven by the first electric motor and is connected communicatively to the control unit and is configured to provide the control unit with an electrical position signal which indicates a measured position;
wherein the control unit is connected communicatively to a wireless communicator and is configured to store the measured position in the memory as said at least one limit position based on the position signal in response to a first instruction received by the wireless communicator;
wherein the control unit is configured to:
provide the first switching signal based on a comparison between the at least one limit position stored in the memory and a position signal measured by the position sensor;
receive a third instruction via the wireless communicator; and
transmit a message comprising information about at least the at least one stored limit position in response to receiving the third instruction;
providing a second electric motor connected to a second switching device of the at least two switching devices, the second switching device comprising:
a control unit which is configured to provide a first switching signal for the second electric motor;
a memory which is connected communicatively to the control unit and is configured to store at least one limit position; and
a position sensor which can be connected to an element driven by the electric second motor and is connected communicatively to the control unit and is configured to provide the control unit with an electrical position signal which indicates a measured position;
wherein the control unit is connected communicatively to a wireless communicator and is configured to store the measured position in the memory as said at least one limit position based on the position signal in response to a first instruction received by the wireless communicator;
wherein the control unit of the second switching device is configured to:
provide the first switching signal based on a comparison between the at least one limit position stored in the memory and a position signal measured by the position sensor;

receive a setup message via the wireless communicator, wherein the setup message comprises information about at least one desired limit position; and store the desired limit position in the memory as said at least one limit position in response to receiving the setup message;

wherein the first and the second electric motor are in a same position;

the method further comprising:

setting up the first switching device by:
a) moving the driven element to a position that corresponds with a limit position which must be stored; and
b) transmitting the first instruction via the wireless communicator or providing the second instruction via a user interface;

retrieving the at least one stored limit position of the first switching device by transmitting the third instruction via the wireless communication means of the first switching device; and setting up the second switching device by transmitting, via the wireless communicator thereof, a setup message comprising information about the at least one requested limit position of the first switching device.

13. The method of claim 11, wherein the at least one switching device is for an electrical drive comprising an electric motor connectable to the element, wherein the electric motor is connected to the control unit of the at least one switching device and is configured to be switched on and/or off by the first switching signal of the at least one switching device.

14. The switching device according to claim 2, wherein the control unit is further configured to:

provide a position signal which indicates the position measured by the sensor; or transmit the position signal via the wireless communicator.

15. The switching device according to claim 2, wherein the control unit is further configured to:

receive a reference position message via the wireless communicator, wherein the reference position message comprises information about at least a reference position; and provide the first switching signal based on a comparison between the reference position and the measured position.

16. The switching device according to claim 2, wherein the position sensor is configured to detect the position of the element driven by the electric motor in absolute sense.

17. The switching device according to claim 2, wherein the memory is configured to store two limit positions.

18. The switching device according to claim 2, wherein:
the memory is configured to store at least one intermediate position; and
the control unit is further configured to provide a second switching signal based on a comparison between the at least one intermediate position and the position signal provided by the position sensor.

19. The switching device according to claim 2, wherein the memory is configured to store at least one emergency stop position, and wherein the control unit is further configured to provide a third switching signal based on a comparison between the at least one emergency stop position and the position signal provided by the position sensor.

20. An electrical drive for driving an element, comprising an electric motor connectable to the element, and a switching device according to claim 2, wherein the electric motor is connected to the control unit of the switching device and is configured to be switched on and/or off by the first switching signal of the switching device.

* * * * *